Nov. 16, 1954 D. MacGREGOR 2,694,547
VALVE STRUCTURE
Filed Nov. 15, 1950 2 Sheets-Sheet 1
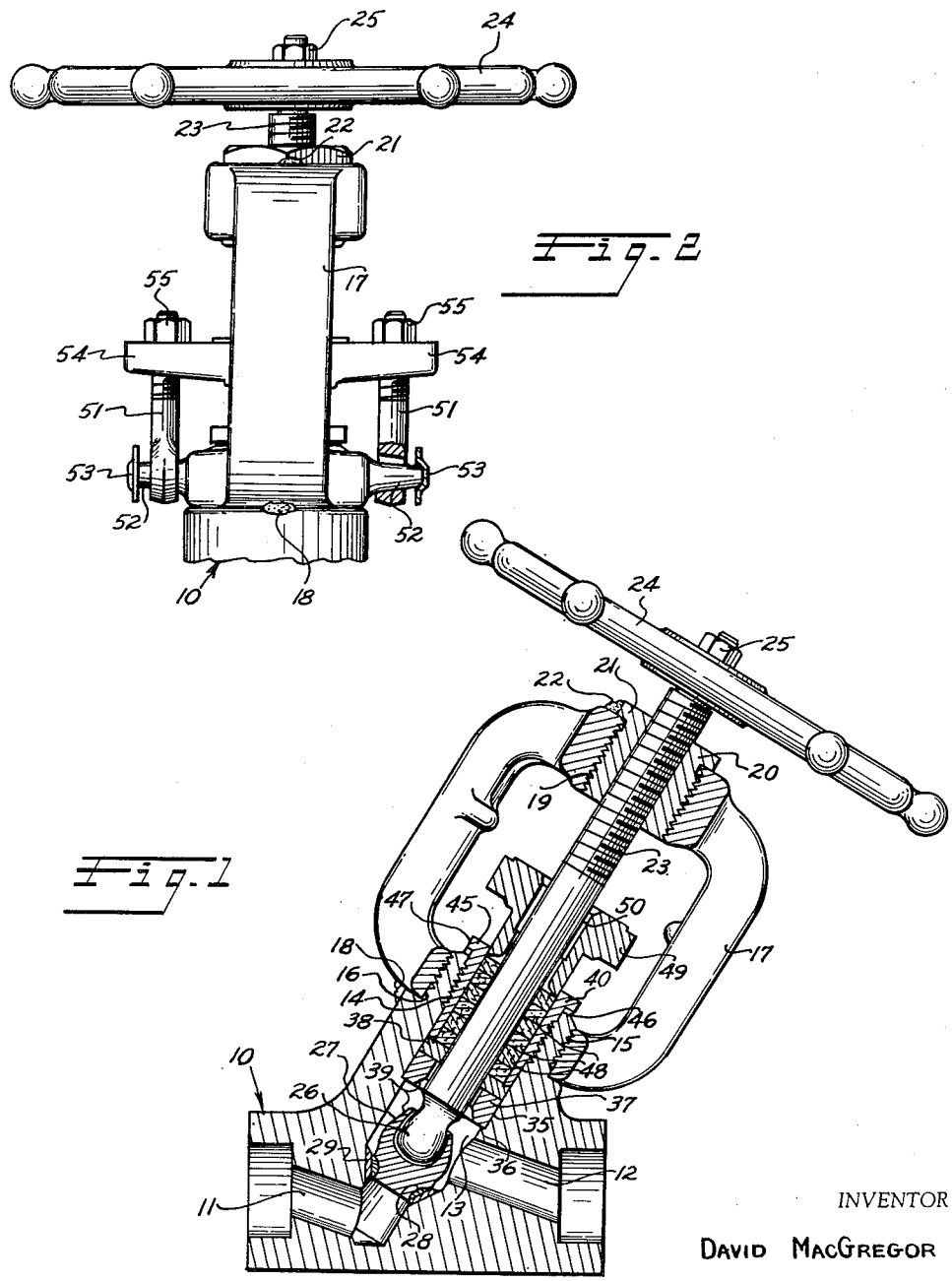
INVENTOR
DAVID MACGREGOR
BY Strauch, Nolan & Diggins
ATTORNEYS Nov. 16, 1954 D. MacGREGOR 2,694,547
VALVE STRUCTURE
Filed Nov. 15, 1950 2 Sheets-Sheet 2
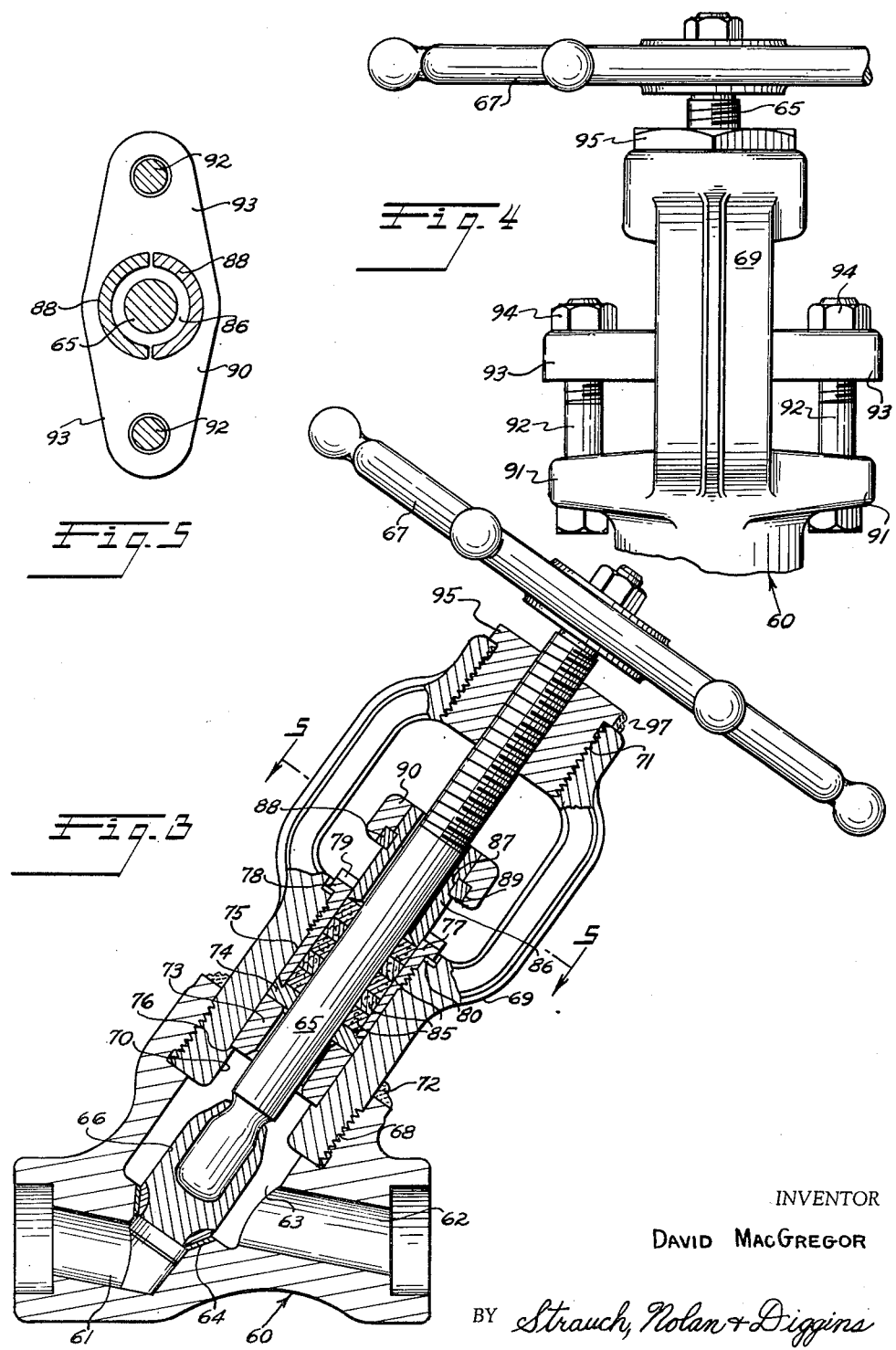
INVENTOR
DAVID MacGREGOR
BY Strauch, Nolan + Diggins
ATTORNEYS United States Patent Office 2,694,547
Patented Nov. 16, 1954

2,694,547
VALVE STRUCTURE

David MacGregor, Munster, Ind., assignor to Edward Valves, Inc., East Chicago, Ind., a corporation of Indiana Application November 15, 1950, Serial No. 195,813

6 Claims. (Cl. 251—264)

This invention relates to valve constructions and more particularly to valves for controlling the flow of high pressure, high temperature fluids which may be readily disassembled for inspection and repair.

The present invention is primarily concerned with improvements in valves of the type disclosed in United States Patent No. 2,261,269. It has been found that the disassembly of valves of this type necessary to accomplish periodic inspection of the valve seat and disc is difficult, time consuming, and expensive. In valves of this type it is necessary to break the weld between the bonnet and the valve body in order to disassemble the valve and to reweld the parts to reestablish the necessary fluid seal upon reassembly of the valve.

Numerous proposals have been advanced to overcome this difficulty. For example, it has been proposed to construct the bonnet and valve body in a single piece with an aperture in the upper end of the bonnet which is large enough to permit withdrawal of the internal components of the valve. This construction, however, is difficult and expensive to produce, access to the seat for inspection and repair is severely limited, and repair work must be accomplished by highly skilled technicians equipped with special tools capable of operating through the extended, narrow aperture in the bonnet.

It has also been proposed to use separate bonnet and body elements which are secured to each other solely by threads. When it is considered that valves of this type must effectively seal fluids which are supplied at pressures of several thousands of pound per square inch at temperatures in the neighborhood of 1000° F. it will be apparent that it is extremely difficult to provide an effective threaded seal which possesses the necessary degree of permanence.

Accordingly, it is the principal purpose and object of the present invention to provide an improved valve construction which offers an effective, permanent seal and which may be readily disassembled for inspection and repair.

It is a further object to provide an improved valve construction in which the parts subject to the most rapid wear are, upon disassembly of the valve, readily and easily accessible for inspection and repair.

It is another object to provide an improved valve construction in which inspection and repair may be accomplished without the use of special tools and highly skilled technicians.

It is also an object to provide an improved sealing structure for a valve which is effective in all operating positions of the valve.

Further objects and advantages will become apparent as the description proceeds in connection with the accompanying drawings in which:

Figure 1 is a central sectional view of a valve embodying the present invention;

Figure 2 is an end elevation of the upper structure of the valve of Figure 1;

Figure 3 is a central sectional view of a modified valve embodying my invention;

Figure 4 is an end elevation of the valve construction of Figure 3; and

Figure 5 is a partial sectional view of the modified valve taken along line 5—5 of Figure 3.

Referring now more particularly to Figures 1 and 2, 10 indicates a valve body having inlet and outlet passages 11 and 12, respectively, which communicate at spaced points with an internal chamber 13 which latter is open at its upper end and terminates in a threaded section 14. An externally threaded reduced section 15 is provided on the upwardly extending portion of the valve body 10 which engages a lower central aperture 16 of a forged steel yoke 17. The yoke 17 is preferably locked in place by one or more tack welds 18. At its upper end, yoke 17 is provided with a threaded aperture 19 in axial alignment with lower aperture 16. A yoke bushing 20 preferably of bronze, having a flange 21 overlying a portion of yoke 17 is threaded into aperture 19 and preferably locked by one or more tack welds or brazing 22. A stem 23 is threaded into bushing 20 and extends downwardly into the chamber 13. At its upper end, stem 23 is provided with a hand wheel 24 held in place by a nut 25. At its lower end, the stem 23 is provided with a knob-like extension 26 on which a valve disc 27 is frictionally mounted for limited seating movement. The disc 27 is provided with an annular hard machined surface 28 which, in the fully closed position of the valve, sealingly engages a similar seating surface 29 formed adjacent the lower inlet end of the chamber 13.

At a point spaced from its lower end, chamber 13 is provided with an enlarged bore 35 constituting a packing chamber forming a shoulder 36 with a main chamber wall. An annular back seat 37 is positioned within bore 35 and held in place against shoulder 36 by an annular temperature-resistant packing ring 38. The back seat 37 and the disc 27 are provided with cooperating tapering surfaces 39 which are in sealing engagement when the valve is in its fully opened position.

Packing ring 38 is forced against back seat 37 by the lower inclined surface of an annular ferrule 40 threaded into the threaded section 14 of valve body 10. The ferrule 40 is provided with a flange 45 which clamps a sealing gasket 46 against a portion of body 10 and is provided at its perpihery with nut surfaces 47 to which a standard wrench may be applied.

A plurality of relatively narrow temperature resistant packing rings 48 are positioned within ferrule 40 surrounding stem 23. It has been found that such narrow packing rings provide a much more effective seal than the wider rings usually employed in valves of this type. Rings 48 are urged against ring 38 by a forged steel gland 49 which is apertured as at 50 to surround stem 23.

As best shown in Figure 2, a pair of eye bolts 51 are swingably mounted on forged tapered studs 52 extending from opposite sides of the lower portion of yoke 17. Bolts 51 are held in place by discs 53 which are welded to the outer ends of studs 52, and extend upwardly through ears 54 of gland 49. Nuts 55 are screwed onto bolts 51 above ears 54 to force gland 49 downwardly, adjustably compressing packing rings 48.

If, after an extended period of use, inspection or repair of the valve disc 27 or seat 29 becomes necessary the valve may be readily disassembled as follows:

First, the hand wheel 24 is removed. The tack weld 22 is broken and the yoke bushing 20 is removed. After loosening the gland bolts and breaking the tack weld 18, yoke 17 is unscrewed from the body 10 and is removed carrying gland 49 with it. After ferrule 40 is unscrewed with an ordinary open end wrench, the stem, disc, back seat and packing ring may be withdrawn from the valve body 10. The seat is thus exposed at a point relatively close to the open end of the body where it may be examined visually with ease, and repaired with conventional tools and techniques without removing the valve body from the line. The valve may be reassembled by reversal of the above procedure and lock welding the yoke to the body.

It is to be noted that there are no internal or special nuts of any kind which require special tools for their removal. Further no special techniques need be employed in assembling or repairing the valve.

Referring now to Figures 3–5, 60 indicates a valve body having inlet and outlet passages 61 and 62, an internal chamber 63 and seat 64 similar to those shown in Figure 2. The stem 65, disc 66 and hand wheel 67 are also similar in design and function to the corresponding components illustrated in Figure 1. Received in an enlarged threaded bore 68 in chamber 63 is a forged steel yoke 69 which is provided at its lower end with a central bore 70 and at its upper end with a central threaded bore 71 in axial alignment with bore 70. The yoke 69 is sealingly secured to the valve body 60 by an annular weld 72. The position, function, and application, of this weld is more fully explained in United States Patent 2,261,269.

A back seat 73 and a packing ring 74 are received within an enlarged bore 75 constituting a packing chamber formed in the yoke 69. The lower edge of the back seat 73 is positioned against an annular shoulder 76 formed at the junction of bores 70 and 75. An annular ferrule 77 is threaded into bore 75 with its lower inclined edge in forced engagement with the packing ring 74. An enlarged flange 78 is provided with tool engaging surfaces 79 and clamps a gasket 80 against a machined surface in the yoke 69. Packing rings 85 are positioned within ferrule 77 around the stem 65 and are adjustably urged downwardly by an annular gland 86. Received within a recess 87 in gland 86 is a split ring 88, the outer surface of which is received within a recess 89 in a gland flange 90 which telescopes over ring 88 and holds it in position. As best shown in Figures 3 and 5, the yoke 69 is provided with oppositely extending ears 91 apertured to receive a pair of gland bolts 92 which extend upwardly through axially aligned holes and ears 93 in flange 90. Nuts 94 are threaded onto bolts 92 above ears 93 and urge the flange, split ring and gland downwardly onto the packing rings.

An annular yoke bushing 95 threaded into bore 71 in the upper end of yoke 69, provides a threaded support for the stem 65 and is locked to yoke 69 by one or more tack welds 97.

The valves of Figures 3–5 are designed primarily for use in installations in which the service requirements are somewhat higher than those for which the valve of Figures 1 and 2 are suited. The welded body-yoke construction permits use of this valve in controlling the flow of fluid at extremely high temperatures and pressures. At the same time the valve may be readily disassembled for inspection and repair as follows:

Hand wheel 67 is removed and tack weld 97 is broken allowing the removal of yoke bushing 95. Gland bolt nuts 94 are then removed freeing the gland flange 90 and split ring 88. After the ferrule 77 is unscrewed, the entire stem, disc, and packing ring assembly may be withdrawn through aperture 71 exposing the seat 64 for inspection and repair. The valve may be reassembled by reversing the above steps, following in part the procedure outlined in United States Patent 2,261,269.

It is to be noted that although the valve may be disassembled without breaking the major weld 72, its outer welded construction combined with the unique gland, stem and packing arrangement permits the use of the valve in installations with most rigorous service requirements.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a valve having a body for the passage of fluid; a valve stem, a back seat surrounding a lower portion of said valve stem, said back seat having an annular upper surface, a first sealing means positioned around said valve stem against said upper surface of said back seat, a ferrule removably positioned around said valve stem above said upper surface of said back seat and adapted to force said first sealing means into engagement with said upper surface of said back seat and said stem, a second sealing means positioned around said valve stem within said ferrule and having its lowermost portion in engagement with said first sealing means, and means to force said second sealing means into engagement with said valve stem and said first sealing means.

2. In the valve of claim 1, a yoke for guiding and positioning said valve stem, and means to removably attach said last mentioned means to said yoke.

3. In a valve having a body for the passage of fluid and an aperture for receiving a valve stem; a removable back seat in said aperture in surrounding relation with said stem; a yoke removably mounted on said body; a first sealing means positioned around said valve stem within said aperture upon said back seat; a ferrule removably mounted in said aperture for urging said first sealing means into engagement with said stem, said aperture, and said back seat; a second sealing means positioned around said stem within said ferrule; a gland for urging second sealing means into engagement with said stem, said ferrule, and said first sealing means; and means for removably attaching said gland to said yoke.

4. In a valve having a body for the passage of fluid and an aperture for receiving a valve stem; a yoke having a central aperture and mounted in said valve body; a removable back seat bushing mounted in said aperture; a first sealing means positioned within said central aperture around said stem upon said bushing; a ferrule removably mounted in said central aperture for urging said first sealing means into engagement with said stem, with the said central aperture, and said back seat bushing; a second sealing means surrounding said stem within said ferrule; a packing gland for urging said second sealing means into engagement with said stem and the wall of said ferrule, and means for removably attaching said gland to said yoke.

5. The structure of claim 4 wherein the last mentioned means includes a split ring removably positioned on said gland, a flange surrounding said gland and said ring, and means for removably attaching said flange to said yoke.

6. In a valve having a body for the passage of fluid and an aperture for receiving a valve stem; a yoke mounted on said valve body for guiding and positioning said valve stem, a first sealing means positioned around a portion of said stem, a second sealing means positioned around another portion of said stem in contact with said first sealing means, a ferrule threaded into said aperture in said valve body for adjustably urging said first sealing means into engagement with said stem, and a packing gland adjustably secured to said yoke for urging said second sealing means into engagement with said stem and with said first sealing means.

References Cited in the file of this patent

UNITED STATES PATENTS

| Number | Name | Date |
|---|---|---|
| 386,647 | Miller | July 24, 1888 |
| 756,731 | Sturtz | Apr. 5, 1904 |
| 1,866,292 | Carlson | July 5, 1932 |
| 1,881,269 | Evans | Oct. 4, 1932 |
| 1,891,374 | Ehemann | Dec. 20, 1932 |
| 1,925,392 | LaBour | Sept. 5, 1933 |
| 1,937,246 | Reedy | Nov. 28, 1933 |
| 2,261,269 | Mohr | Nov. 4, 1941 |
| 2,301,976 | Schellens | Nov. 17, 1942 |
| 2,316,957 | Hehemann | Apr. 20, 1943 |
| 2,555,262 | Weinberg | May 29, 1951 |